United States Patent [19]

De Silvestri et al.

[11] Patent Number: 4,953,175

[45] Date of Patent: Aug. 28, 1990

[54] UNSTABLE LASER RESONATOR WITH OUTPUT COUPLER HAVING RADIALLY VARIABLE REFLECTIVITY

[75] Inventors: Sandro De Silvestri, Milan; Paolo Laporta, Cassina de'Pecchi MI; Orazio Svelto, Segrate MI, all of Italy

[73] Assignee: Consiglio Nazionale Delle Ricerche, Rom, Italy

[21] Appl. No.: 464,641

[22] Filed: Jan. 10, 1990

Related U.S. Application Data

[63] Continuation of Ser. No. 8,593, Jan. 29, 1987, abandoned.

[30] Foreign Application Priority Data

Jan. 29, 1986 [IT] Italy .................. 19223 A/86

[51] Int. Cl.⁵ .............................................. H01S 3/08
[52] U.S. Cl. ..................................... 372/95; 372/108; 372/99
[58] Field of Search ............ 372/95, 92; 378/98, 378/99, 107, 108

[56] References Cited

U.S. PATENT DOCUMENTS

| | | | |
|---|---|---|---|
| 3,187,270 | 6/1965 | Kogelnik et al. | 372/97 |
| 3,497,826 | 2/1970 | Foster | 372/97 |
| 3,559,102 | 1/1971 | Uekvi | 372/97 |
| 4,156,209 | 4/1979 | Herbst et al. | 372/95 |
| 4,219,254 | 8/1980 | Macken | 372/99 |
| 4,287,482 | 9/1981 | Wert, III | 372/92 |
| 4,553,244 | 11/1985 | Benedict et al. | 372/108 |
| 4,575,849 | 3/1986 | Chun | 378/101 |
| 4,698,816 | 10/1987 | Chunw | 372/101 |

OTHER PUBLICATIONS

Bethen; "Megawatt Power", at $1.318\mu$ in $Nd^{3+}$: YAG and Simultaneous Oscill. at Both $1.06$ and $1.318\mu$; IEEE J. of Quant. Electronics; Feb. 1973.

Eichler et al; "Realization of a Mode-Selective Three-Mirror Reflector", IEEE J.Q.E., vol. QE-11, No. 4, pp. 168-170, Apr. 1975.

Perel et al; "The Effect of Movement of an Additional Mirror on the Intensity Produced by a Gas Laser"; Opt. Spect., vol. 37(3), Sep.'74.

*Primary Examiner*—Léon Scott, Jr.
*Attorney, Agent, or Firm*—Cushman, Darby & Cushman

[57] ABSTRACT

Laser apparatus which generates a uniform laser beam of minimum divergence and maximum intensity includes a resonator cavity having a laser source and first and second mirror devices disposed on opposite sides of the source. The first mirror reflects pumped laser light within the cavity. The second mirror includes two mirror elements, both of which also reflect pumped laser light within the cavity. The two mirror elements of the second mirror device have specific configurations and a selected distance therebetween to cause the generation of a uniform output laser beam. That is, the laser light reflected from the second mirror element is dephased with respect to laser light reflected from the first mirror element by a whole number of periods of the laser light at the centerline between the first and second mirror elements. Also, laser light reflected from the second mirror is dephased with respect to laser light reflected from the first mirror by a whole number plus a half of the laser light period at the lateral edges of the first and second mirror elements.

8 Claims, 1 Drawing Sheet

UNSTABLE LASER RESONATOR WITH OUTPUT COUPLER HAVING RADIALLY VARIABLE REFLECTIVITY

This is a continuation of application Ser. No. 07/008,593, filed Jan. 29, 1987, which was abandoned upon the filing hereof.

BACKGROUND OF THE INVENTION

The present invention relates to an unstable laser resonator with output coupler having radially variable reflectivity.

The main problem with laser resonators is that they generate a high-intensity beam with minimum divergence. Present resonators for high-intensity laser beams belong to the unstable resonator category.

A known unstable laser resonator requires the employment of a totally reflecting concave mirror at one end of the resonating cavity and a small totally reflecting convex mirror at the other end. Such a resonator is characterized at the smaller mirror by a stepped reflectivity curve which causes emission of a laser beam to be null in the centre and maximum on the periphery distributed according to a circular ring with extension equal to the difference in the dimensions of the two mirrors. The output beam is thus perturbed by the diffraction effects which occur at the side edge of the smaller mirror.

SUMMARY OF THE INVENTION

The object of the present invention is to accomplish an unstable laser resonator which would allow generation of a uniform laser beam of minimum divergence and maximum intensity.

In accordance with the invention this object is achieved by an unstable resonator comprising a mirror at one end and a beam output coupler at the other end characterized in that the output coupler comprises a first mirror element arranged toward the interior of the resonating cavity and a second mirror element arranged toward the exterior of the resonating cavity, the mirror elements having reflecting surfaces so formed and placed at a distance such that they describe a reflectivity curve varying radially from the centre to the periphery of the output coupler.

For example, the distance and curvature of the reflecting surfaces are selected in such a manner as to dephase the rays reflected by the second mirror element in relation to those reflected by the first by a whole number of periods at the centre and another half-period at the periphery.

In this manner the laser resonator in accordance with the invention is enabled to operate with laser rays which are added in phase at the centre of the output coupler while they are subtracted in phase opposition at the periphery thereof. The output coupler thus has radially variable reflectivity. By means of appropriate selection of the radius of curvature of the interior surfaces of the two mirror elements the reflectivity curve can be made to slowly diminish from the centre to the periphery of the output coupler.

The resonator also preserves the properties of unstable resonators as regards divergence, which is the minimum divergence established by diffraction, and of maximum power density. The laser beam is in this case completely uniform and free from high frequency spectral components. It is therefore perculiarly suited to machining, medicine and military applications.

Experimental tests performed with an Nd:YAG laser have shown the complete validity of the idea and supplied output beams of considerable power and divergence at the diffraction limit.

BRIEF DESCRIPTION OF THE DRAWING

For better understanding of the characteristics of the laser resonator in accordance with the invention reference will now be made to the annexed drawings wherein.

DETAILED DESCRIPTION OF THE PREFERRED EMBODIMENT

Figure 1:
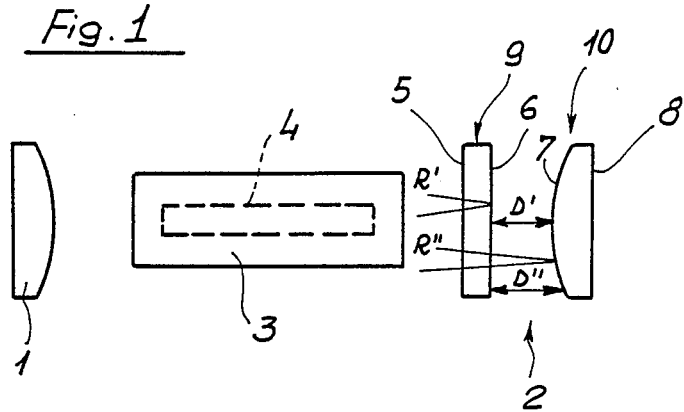
FIG. 1 shows an illustrative diagram of a laser resonator according to the invention.

FIG. 1 shows an example of a laser resonator in accordance with the invention which comprises essentially two opposed mirrors 1 and 2 between which is formed a pumping cavity 3 in which is housed an appropiate active element 4, for example Nd:YAG.

The mirror 1 is for example a totally reflecting convex mirror. Alternatively it may be concave and only partially reflecting. The coupler 2 is for example made up of a plane-plane mirror 9 optionally covered with a nonreflecting coating on the surface 5 turned toward the active element 4 and partially reflecting on the other surface 6 and of an adjacent convex-plane mirror element 10 with convex surface 7 partially reflecting and plane surface 8 optionally covered with a nonreflecting coating. On the basis of the previous description of the invention the surfaces which generate the variable profile of reflectivity are the surfaces 6 and 7.

By known procedures the active element 4 gives rise to the emission of rays R which oscillate from one mirror to the other, being reflected and thus forced to pass again through the active element 4 and consequently receiving therefrom an energy gain. When a certain threshhold is reached a part of the rays R is emitted from the output coupler 2, forming a laser beam F.

It is important to note that the described embodiment of the output coupler 2 in two adjacent elements 9 and 10 with facing reflecting surfaces 6 and 7 causes some rays R' to be reflected by the surface 6 and other rays R" by the surface 7. The distance between the two reflecting surfaces 6 and 7, and their curvature, cause dephasing of the rays R' and R".

For example, the distance between the two reflecting surfaces 6 and 7 and their curvature may be selected in such a manner that the distance at the centre D' us such as to dephase the rays R" by a whole number of periods relative to the rays R' and the distance at the periphery D" is such as to dephase the rays R" by a further half-period in relation to the rays R'. The result is that the rays R' and R" are in phase and hence are added at the centre of the output coupler 2 while they are in phase opposition and hence subtracted at the periphery thereof.

Figure 2:
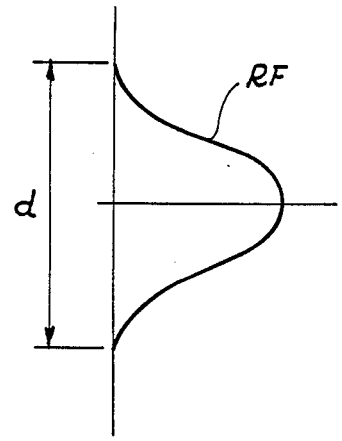
FIG. 2 shows the reflectivity curve of the output coupler in the resonator of FIG. 1.

There is consequently a reflectivity curve RF with a profile slowly diminishing from the centre to the periphery of the coupler like that traced in FIG. 2. The exact shape of the curve depends on the distance and reflectivity of the two reflecting elements 6 and 7.

Easy mathematical considerations give the following expressions for calculation of the distances D' and D", as follows.

$$D' = (2n+1)\lambda/4 \text{ (n=whole number)}$$

$$D'' = D' + \lambda/4$$

The radius of curvature C of the surface 7 (assuming the surface 6 to be flat) is given by the expression:

$$C = d^2/2\lambda$$

where d is the diameter of the laser beam.

Figure 3:
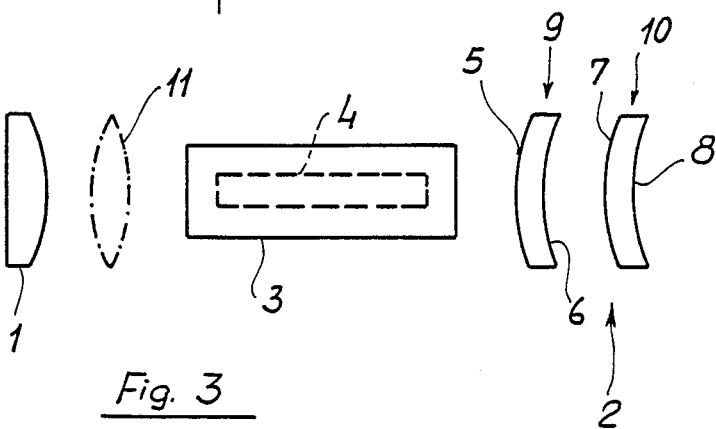
FIG. 3 shows a possible variant of the resonator in accordance with the invention.

Naturally other conformations and distances of the two reflecting surfaces 6 and 7 can cause different curves of reflectivity depending on requirements. For example, both the facing surfaces 6 and 7 can be curved (concave or convex) and the remaining surfaces 5 and 8 can be of any conformation as shown in FIG. 3. Also, an optical system, e.g. a lens 11, can be placed between the pumping cavity 3 and the mirror 1, as shown in FIG. 3.

We claim:

1. Laser apparatus having a radially variable reflectivity, comprising:
    a laser cavity having a first mirror at one end thereof, and a beam output mirror system at another end thereof;
    said output mirror system comprising a first mirror element disposed on an opposite side of said cavity from said first mirror, and a second mirror element disposed on an opposite side of first mirror element from said cavity, said first element having a light reflecting surface with a first radius of curvature, said second mirror element having a second light reflecting surface with a second radius of curvature, said second mirror element being disposed at a centerline distance from said first mirror element;
    said centerline distance between said first and second mirror elements being equal to a multiple of the wavelength of the light so as to cause light reflected from said second mirror element reflecting surface to be dephased with respect to light reflected from said first mirror element reflecting surface by a whole number of periods of said light at the centerline between said first and second mirror elements;
    said first and second radii of curvature of said first and second mirror element reflecting surfaces having values such that a distance between said first and second mirror elements progressively increases from the centerline to the lateral edge of the output mirror system to reach a value equal to said multiple plus a half period of the wavelength of the light so that light reflected from said second mirror element reflecting surface is dephased with respect to light reflected from said first mirror element reflecting surface by said whole number of periods plus a further half period of said light at a lateral edge of said output mirror system.

2. Apparatus in accordance with claim 1 wherein said reflecting surface of the first mirror element is planar, and the reflecting surface of said second mirror element is convex.

3. Apparatus in accordance with claim 2 wherein a radius of curvature of the reflecting surface of said second mirror element is $C = d^2/2\lambda$ where d is a diameter of the laser beam.

4. Apparatus in accordance with claim 1 wherein said reflecting surface of the first and second mirror elements are both curved.

5. Apparatus in accordance with claim 1 wherein said first mirror is convex-shaped.

6. Apparatus in accordance with claim 1 wherein a distance between said first and second reflecting surfaces at said centerline is $D' = (2n+1)\lambda/4$ where n is a whole number and $\lambda$ is a wavelength of said light, and wherein a distance between said first and second reflecting surfaces at said lateral edges is $D'' = D' + \lambda/4$.

7. Laser apparatus having a radially variable reflectivity, comprising:
    a resonator cavity including:
    (a) pumping cavity means for pumping laser light;
    (b) first mirror means, disposed at one end of said pumping cavity means, for reflecting pumped laser light; and
    (c) an output coupler mirror device disposed at a second end of said pumping cavity, said output coupler device including:
        (1) a first mirror disposed at said pumping cavity means second end, for reflecting said pumped laser light back toward said pumping cavity means, and for passing pumped laser light which has reached a predetermined energy level, said first mirror having a first radius of curvature; and
        (2) a second mirror disposed on an opposite side of said first mirror from said pumping cavity means, for reflecting said pumped laser light back toward said pumping cavity means, and for passing pumped laser light which has reached a predetermined energy level, said second mirror having a second radius of curvature and being disposed at a centerline distance from said first mirror;
    said centerline distance between said first and second mirrors and said first and second radii of curvature being equal to a multiple of the wavelength of the light so as to cause: (a) laser light reflected from said second mirror to be dephased with respect to laser light reflected from said first mirror by a whole number of periods of said laser light at a centerline between said first and second mirrors; and having values such that a distance between said first and second mirrors progressively increases from the centerline to the lateral edge of the output mirror system to reach a value equal to said multiple plus a half period of the wavelength of the light so that (b) laser light reflected from said second mirror is dephased with respect to laser light reflected from said first mirror by a whole number plus a half of said periods of said laser light at a predetermined distance from said centerline.

8. Laser apparatus having a radially variable reflectivity, comprising:
    pumping cavity means for pumping laser light;
    first mirror means, disposed at one end of said pumping cavity means, for reflecting pumped laser light; and
    second mirror means, disposed at a second end of said pumping cavity means, for (a) reflecting pumped laser light back toward said pumping cavity means, and (b) passing laser light which has been pumped to a predetermined energy level, said second mirror means including:

a first mirror disposed at said second end of said pumping cavity and having a first radius of curvature; and a second mirror disposed on an opposite side of said first mirror from said pumping cavity means at a centerline distance from said first mirror, said second mirror having a second radius of curvature and reflecting pumped laser light back toward said pumping cavity means;

said centerline distance between said first and second mirrors and said first and second radii of curvature being equal to a multiple of the wavelength of light so as to cause: (a) laser light reflected from said second mirror to be dephased with respect to laser light reflected from said first mirror by a whole number of periods of said laser light at a centerline between said first and second mirrors; and having values such that a distance between said first and second mirrors progressively increases from the centerline to the lateral edge of the output mirror system to reach a value equal to said multiple plus a half period of the wavelength of the light so that (b) laser light reflected from said second mirror is dephased with respect to laser light reflected from said first mirror by a whole number plus a half of said periods of said laser light at a predetermined distance from said centerline.

* * * * *